United States Patent
Beaven et al.

(10) Patent No.: US 6,901,578 B1
(45) Date of Patent: May 31, 2005

(54) DATA PROCESSING ACTIVITY LIFECYCLE CONTROL

(75) Inventors: John Anthony Beaven, Romsey (GB); Amanda Elizabeth Chessell, Alton (GB); Catherine Griffin, Romsey (GB); Iain Stuart Caldwell Houston, Dorset (GB); Martin Mulholland, Winchester (GB); Ian Robinson, Southampton (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,282

(22) Filed: Dec. 6, 1999

(51) Int. Cl.$^7$ ................................................. G06F 9/45
(52) U.S. Cl. ............................... 717/1; 717/2; 717/10; 707/103; 707/513; 709/315; 709/316
(58) Field of Search ................................. 709/220, 224, 709/227, 315, 316; 717/104, 1, 100, 2, 103, 3, 513, 5, 10; 707/102, 100, 513

(56) References Cited

U.S. PATENT DOCUMENTS

| | | | | |
|---|---|---|---|---|
| 5,499,371 A | * | 3/1996 | Henninger et al. | 717/108 |
| 5,706,502 A | * | 1/1998 | Foley et al. | 707/10 |
| 5,875,333 A | * | 2/1999 | Fish et al. | 717/109 |
| 6,199,195 B1 | * | 3/2001 | Goodwin et al. | 717/104 |
| 6,505,342 B1 | * | 1/2003 | Hartmann et al. | 717/104 |
| 6,557,009 B1 | * | 4/2003 | Singer et al. | 707/104.1 |
| 6,571,282 B1 | * | 5/2003 | Bowman-Amuah | 709/219 |
| 6,591,272 B1 | * | 7/2003 | Williams | 707/102 |
| 6,615,253 B1 | * | 9/2003 | Bowman-Amuah | 709/219 |
| 6,640,238 B1 | * | 10/2003 | Bowman-Amuah | 709/201 |
| 6,704,873 B1 | * | 3/2004 | Underwood | 713/201 |

* cited by examiner

*Primary Examiner*—Zarni Maung
*Assistant Examiner*—Khanh Quang Dinh
(74) *Attorney, Agent, or Firm*—Edward H. Duffield; George E. Grosser

(57) ABSTRACT

Disclosed is apparatus for processing business data processing activities, the apparatus comprising: an activity instance; and a descriptor for the activity instance associated uniquely with the activity instance; wherein the descriptor includes parameters for determining lifecycle behaviors of said activity instance. The descriptor may be programmable to modify the lifecycle behaviors according to a use made of said activity instance. The use of the activity instance may be responsive to a request by a client. It may also be responsive to a request by an activity instance. The descriptor may be programmable to modify the lifecycle behaviors according to a position in a system hierarchy of the activity instance.

23 Claims, 3 Drawing Sheets

DATA PROCESSING ACTIVITY LIFECYCLE CONTROL

FIELD OF THE INVENTION

This invention relates to the field of data processing, and more particularly to data processing in a component-based business processing environment.

BACKGROUND OF THE INVENTION

In a component-based business data processing environment, there are typically mixtures of data processing activities in a system at any one time. These activities may have complex relationships and interdependencies, and the management of their deployment and life-cycles can be difficult and time-consuming for the system designer and programmer. To ease this management task, components (typically instances of objects in an object-oriented environment) are normally grouped in classes, with each object in a class having the same characteristics as all others in its class. It is well-known in the art to have objects in classes with common run-time characteristics determined at the class level.

In such an environment, the life-cycle of a component normally follows the typical pattern of the life-cycle of an instance of an object in an object-oriented environment. That is, each component belonging to a particular class takes its characteristics from the class. Normally, the management of a component's life cycle is predetermined by settings given to the class of which it is a member.

An example of such an environment is an Enterprise Java Beans environment, in which Java Bean components are provided with deployment descriptors which contain settings to determine the characteristics of each instance of each Java Bean. When used as a business processing environment, the Enterprise Java Beans represent business activities which may be linked together in sequence, or sometimes executed in parallel, to perform business processing on behalf of client programs. Such an environment is described in *Enterprise Java Beans Technology*, by Anne Thomas (published by Patricia Seybold Group), which is herein incorporated by reference. In such an environment, the degree of abstraction of the process of combining flexible components into a real-world runtime information processing system renders the problem of the detailed control of individual data processing elements and all their relationships with heterogeneous resources, extremely difficult.

A business model can be defined by a set of nested communicating business activities. Each activity performs a specified function based on the message it is passed when another activity communicates with it. One basis of such models is that each activity has no knowledge of the activities that it communicates with; it simply receives an input message and, when appropriate, generates an output message. The way the activities are wired together is defined in the business model and does not affect the processing of the activity.

An activity may be defined as an object that responds to one or more messages, which has runtime characteristics and state data, and which responds to a received message by performing some processing and producing an output message. Both the input and output messages are strictly defined for each activity. Such activities can be nested. That is, a first activity can initiate a second activity which performs processing on behalf of the first activity and then returns control to the first activity.

Each activity has associated with it certain characteristics by which it may be controlled. It is known in the art to have components which have built-in mechanisms for managing themselves at run-time. Examples of such components are the Enterprise Java Beans already discussed, each of which has a deployment descriptor determined by the class of which it is a member. Deployment descriptors typically contain information that permits an activity to be, for example, recoverable, or to permit it to form part of a transactional entity so that its updates to a database may be coordinated with those of other transactions in the system. In the Enterprise Java Bean environment, the client creates beans (instances) when they are needed for a particular processing action, and destroys them when they are no longer needed for the particular processing action. This can be wasteful in its consumption of resources: where many clients are initiating and terminating processing in a busy environment, the system can be consuming considerable processing resource in the creation and destruction of these instances. Such an environment is also rather rigid in that a whole class of beans must have the same deployment characteristics.

SUMMARY OF THE INVENTION

Accordingly, in a first aspect, the present invention provides apparatus for processing business data processing activities, said apparatus comprising: an activity instance; and a descriptor for said activity instance associated uniquely with said activity instance;
wherein said descriptor includes parameters for determining lifecycle behaviors of said activity instance.

Said descriptor is preferably programmable to modify said lifecycle behaviors according to a use made of said activity instance.

A use of said activity instance may be responsive to a request by a client. A use of said activity instance may be responsive to a request by an activity instance.

Said descriptor is preferably programmable to modify said lifecycle behaviors according to a position in a system hierarchy of said activity instance.

Preferably, said descriptor enables control of concurrency of activity instances. Preferably, said descriptor enables control of re-creation of activity instances. Preferably, said descriptor enables control of termination of activity instances. Preferably, said descriptor permits creation of an activity instance identifier.

In a second aspect, the present invention provides a method for processing business data processing activities, said method comprising the steps of: defining activity lifecycle characteristics in a descriptor; associating said descriptor uniquely with an activity instance; and using said descriptor to control a lifecycle of said activity instance.

Preferably, said descriptor is programmable to enable definition of varying activity lifecycle characteristics according to a use made of said activity instance. Said use of said activity instance may be responsive to a request by a client. Said use of said activity instance may be responsive to a request by an activity instance.

Preferably, said descriptor is programmable to modify said lifecycle behaviors according to a position in a system hierarchy of said activity instance.

Said descriptor preferably enables control of concurrency of activity instances. Said descriptor preferably enables control of re-creation of activity instances. Said descriptor preferably enables control of termination of activity instances. Said descriptor preferably permits creation of an activity instance identifier.

In a third aspect, the present invention provides a computer program product comprising computer program instructions stored on a computer-readable medium for, when loaded into a computer and executed, causing the computer to carry out the steps of the method of the second aspect.

In business-model-driven systems it is necessary to control the lifecycle of each activity instance, that is when should the activity instance be created and when should it be destroyed. The lifecycle of activity instances might need to cover the following scenarios:

1. An activity instance that is created when it receives a message.
2. An activity instance that is created before it receives a message.
3. An activity instance that processes a single message.
4. An activity instance that processes many messages.

In addition, an activity instance that processes many messages may need to be identifiable so that once it has been created it can be recontacted. In this way when a message is received it can be processed either by a new or an existing instance of the activity, based on information passed on the message.

The present invention enables the specification of activity lifecycle characteristics in the business model. This is in the form of properties assigned to each activity. These properties are then interpreted by the system in order to manage the lifecycle of the activities wherever possible.

The present invention advantageously relieves activities from the processing burden of managing their own lifecycles. The lifecycle properties are specified when the business model is defined and are handled by the system. The present invention also avoids the lack of flexibility of the class-based deployment descriptor mechanism of the EJB environment.

BRIEF DESCRIPTION OF THE DRAWINGS

A preferred embodiment of the present invention will now be described by way of example, with reference to the drawings in which.

DETAILED DESCRIPTION OF A PREFERRED EMBODIMENT OF THE INVENTION

Figure 1:
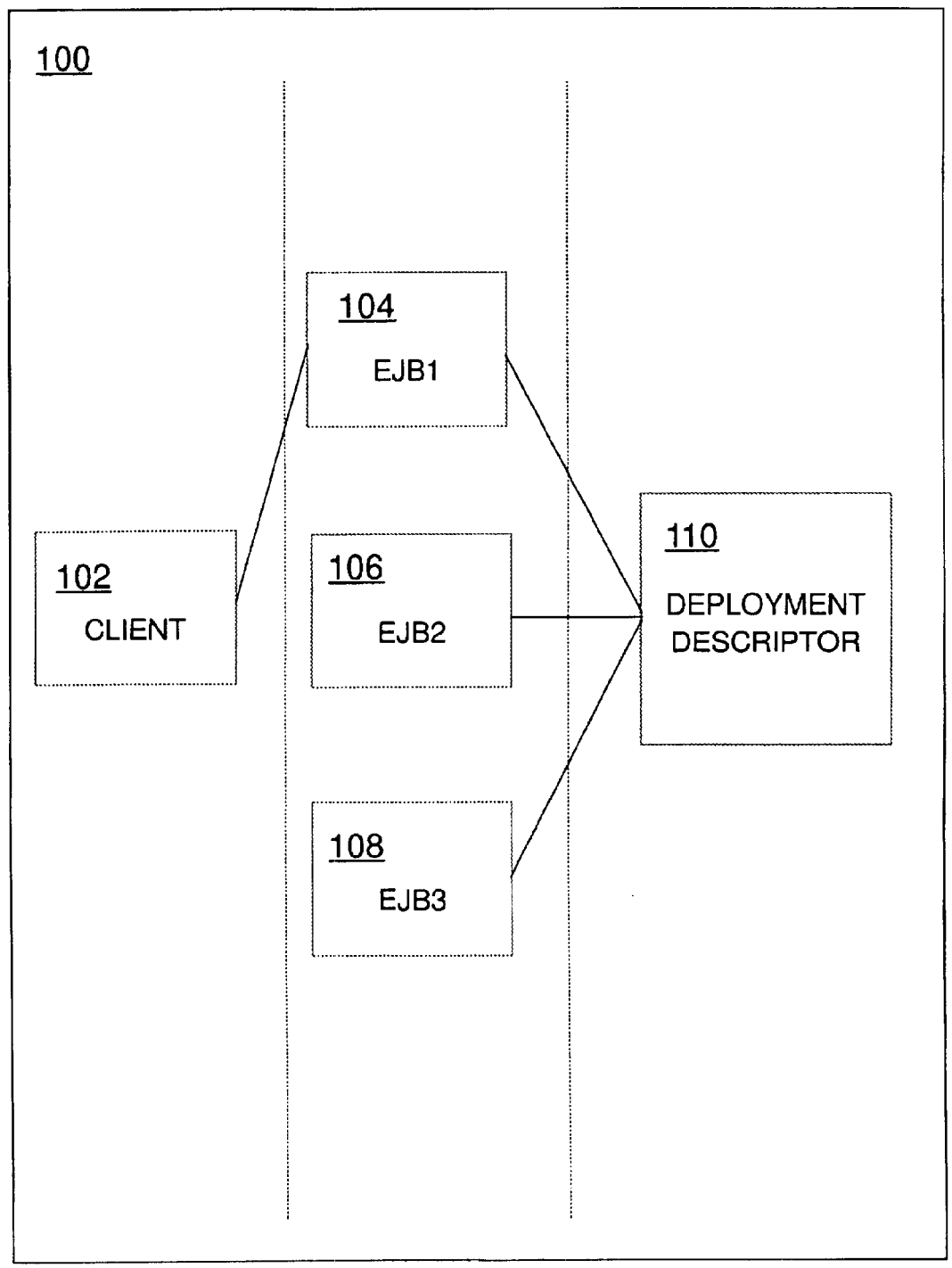
FIG. 1 shows a data processing system according to the prior art.

FIG. 1 shows a data processing system (100) having a client program (102) and Enterprise Java Beans, or EJBs (104, 106, 108). The EJBs (104, 106, 108) perform business processing in system (100) when they are instantiated at the request of client program (102). The EJBs (104, 106, 108) shown in the present exemplary drawing belong to the same class. This is of a course, a simplification; in reality, there would be many more EJBs in the system, and they would typically belong to many classes.

Each EJB class has a deployment descriptor associated with it. In the present simplified example, all the EJBs (104, 106, 108) belong to the same class, and therefore have the same deployment descriptor (110).

The deployment descriptor (110) contains a set of properties which determine run-time characteristics of each EJB (104, 106, 108) in the class. Thus, although client program (102) causes EJB1 (104) to be instantiated, EJB1's run-time characteristics are determined by its membership of the same class as EJB2 (106) and EJB3 (108). Should there be a need to use the function of EJB1 (104) at a different level in the system hierarchy, for example, as a parent transaction with nested sub-transactions in an extended transaction structure, it must be re-created with an assignment to a different class in order for run-time characteristics to be assigned appropriately to its new function. When this is done, it will, of course, share its run-time characteristics with all the other members of that class.

The preferred embodiment of the present invention advantageously alleviates these problems in the prior art.

Figure 2:
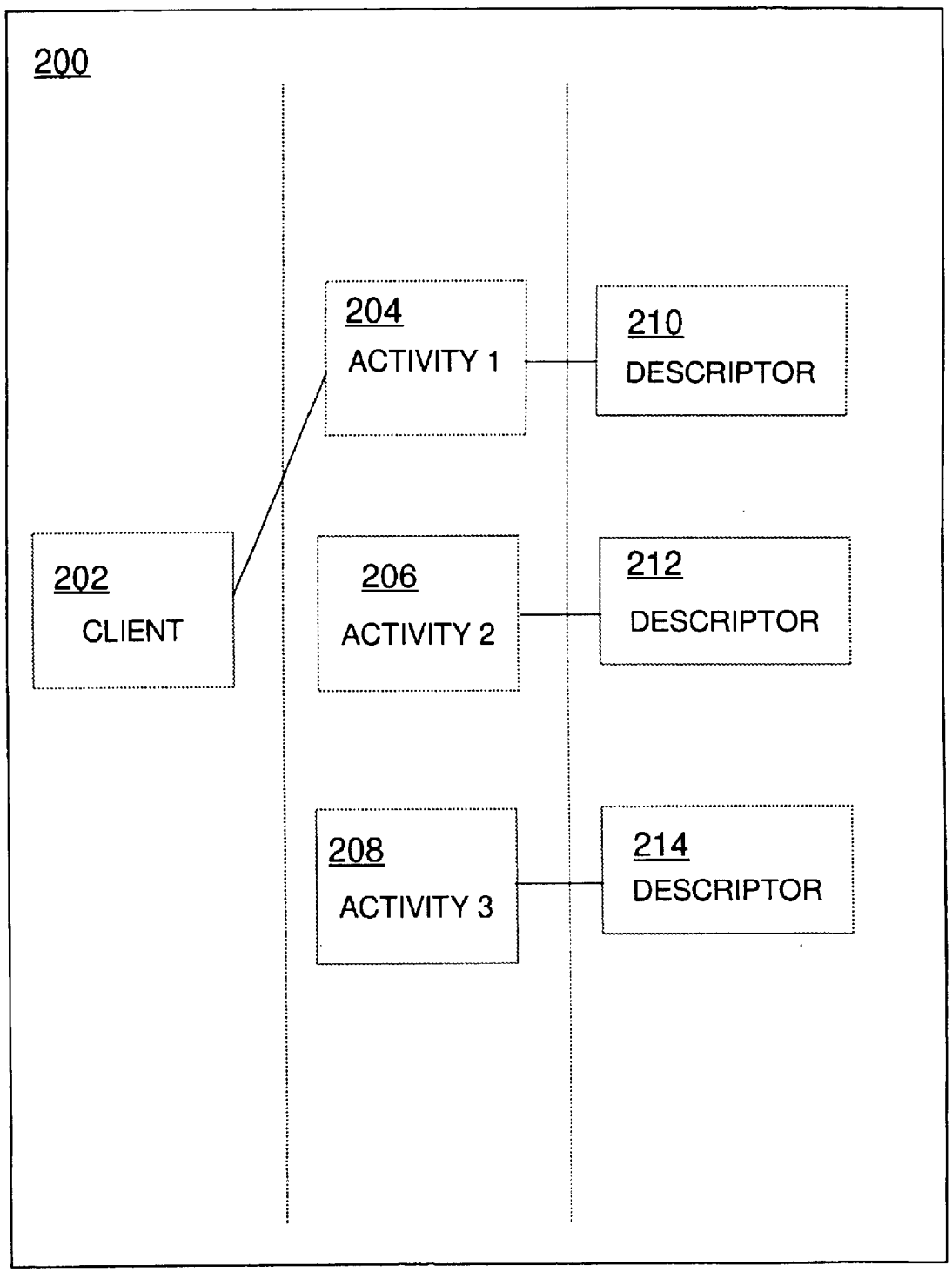
FIG. 2 shows a data processing system of a preferred embodiment of the present invention.

FIG. 2 shows a data processing system according to the preferred embodiment of the present invention, the data processing system (200) having a client program (202) and activities (204, 206, 208). The activities (204, 206, 208) perform business processing in system (200) when they are instantiated under the control of lifecycle properties. The activities (204, 206, 208) shown in the present exemplary drawing do not need to belong to the same class; they may or may not have the same run-time characteristics and this is wholly independent of their class membership. The lifecycle properties are associated with an activity, and therefore may vary depending on the use to which that instance is being put.

Each activity has a descriptor associated with it. Each of the activities (204, 206, 208) has its own descriptor (respectively 210, 212, 214). The descriptors (210, 212, 214) contain sets of properties which determine run-time characteristics of the respective activities (204, 206, 208) when they are instantiated. Thus, when client program (202) causes an instance of an activity (for example, 204) to start by issuing a message requiring business processing to take place, it has no knowledge of the identity or characteristics of the activity instance. Thus, the client has no knowledge of, for example, the identity of the activity, nor whether an activity instance already exists before the client input, nor whether an activity instance continues to exist after the response message has been received by the client. For example, the decisions as to whether a new activity instance is required to service an input message from a client, and whether the activity instance is to be retained for reuse after responding to the client, are determined by the lifecycle properties associated uniquely with that activity.

This makes it possible to assign, for example, the following properties to an activity:

An activity can be lazy or eager, that is:
  lazy: An activity instance is created only when a message is sent for it to process.
  eager: An activity instance is started automatically when its parent activity instance is started.

An activity can be defined as having one of the following concurrency characteristics: per-message or multi-message or switched-input; that is:
  per-message: An activity instance is given one message (or set of messages) and is destroyed when it has finished processing that message.
  multi-message: An activity instance has no limit to the number of messages (or sets of messages) that it can receive. Such an activity instance must either destroy itself or be destroyed when its parent activity is destroyed.
  switched-input: A multi-message activity instance is assigned an identifier that is returned to the sender. When a message is received if it specifies the identifier of an existing activity instance, the message is given to that instance otherwise a new activity instance is created to handle the message.

Clearly, this list of examples of settings is not exhaustive. Those skilled in the art will see that there are other possible lifecycle-related settings that can be stored and used to control activity instances using the same structures.

It will also be clear to those skilled in the art that an activity instance may be described in software terms as comprising elements of program code and data. It may also, clearly be described as an instantiated arrangement or configuration of binary electronic switch values embodied in a memory. Similarly, while a descriptor may be described as a software element, it is also clearly a structure of data physically embodied in binary electronic switch values in a memory.

Figure 3:
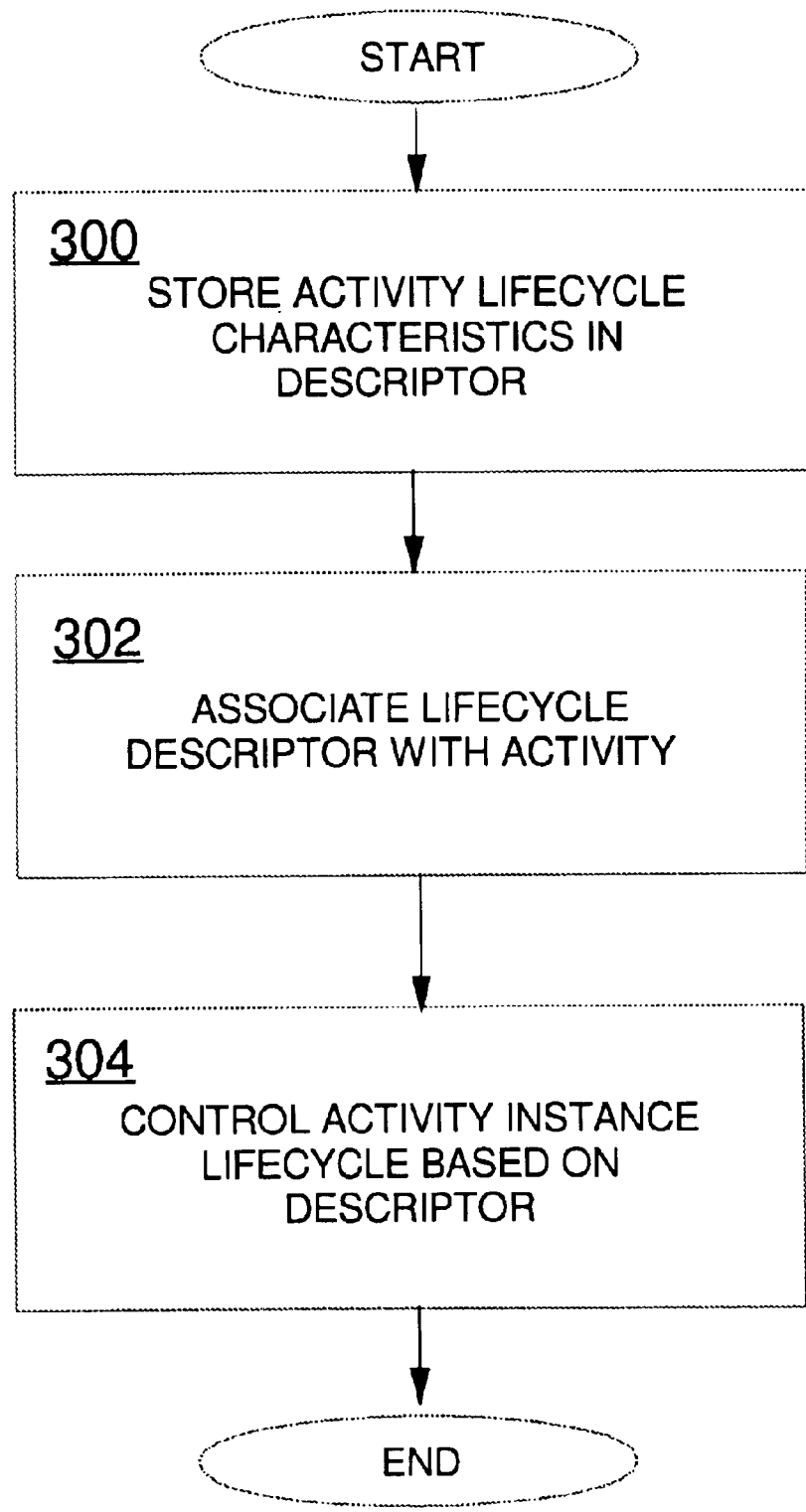
FIG. 3 is a flow chart showing a sequence of processing steps according to a method of the preferred embodiment.

In FIG. 3, the steps of the method of the preferred embodiment are shown. In step (300), the activity lifecycle characteristics are accepted and stored in the descriptor. In step (302), the lifecycle descriptor is uniquely associated with an activity. In step (304), when an activity is instantiated, its lifecycle is controlled on the basis of the settings in the descriptor.

What is claimed is:

1. Apparatus increasing flexibility for processing business data activities during runtime, said apparatus comprising:
   plural activity instances applied for reactive uses at runtime; and
   a descriptor for each said activity instance which is customized according to predefined alternatives for runtime processing for each said activity instance;
   wherein said descriptor includes parameters which are programmable at runtime for determining lifecycle behaviors of each said activity instance in accordance with the processing of the activity instance occuring at runtime, whereby lifecycle behavior is customized for each activity instance during runtime.

2. Apparatus as claimed in claim 1 wherein said descriptor is programmable to modify said lifecycle behaviors according to a use made of said activity instance.

3. Apparatus as claimed in claim 2 wherein said use of said activity instance is responsive to a request by a client.

4. Apparatus as claimed in claim 2 wherein said use of said activity instance is responsive to a request by an activity instance.

5. Apparatus as claimed in claim 1, wherein said descriptor is programmable to modify said lifecycle behaviors according to a position in a system hierarchy of said activity instance.

6. Apparatus as claimed in claim 1, wherein said descriptor enables control of concurrency of activity instances.

7. Apparatus as claimed in claim 1, wherein said descriptor enables control of re-creation of activity instances.

8. Apparatus as claimed in claim 1, wherein said descriptor enables control of termination of activity instances.

9. Apparatus as claimed in claim 1, wherein said descriptor permits creation of an activity instance identifier.

10. A method for customizing the processing of business data, activity instances respective of conditions occurring at runtime, said method comprising the steps of:
    defining, in a descriptor, activity lifecycle characteristics that are customized respective of predefined alternatives for processing each respective activity instance at runtime;
    associating such a descriptor with said respective activity instance; and
    using said descriptor to control a lifecycle of said activity instance according to the processing thereof at runtime, whereby lifecycle characteristics are adjusted to correspond to the actual runtime processing of the activity instance.

11. A method as claimed in claim 10, wherein said descriptor is programmable to enable definition of varying activity lifecycle characteristics according to a use made of said activity instance.

12. A method as claimed in claim 11 wherein said use of said activity instance is responsive to a request by a client.

13. A method as claimed in claim 11 wherein said use of said activity instance is responsive to a request by an activity instance.

14. A method as claimed in claim 10, wherein said descriptor is programmable to modify said lifecycle behaviors according to a position in a system hierarchy of said activity instance.

15. A method as claimed in claim 10, wherein said descriptor enables control of concurrency of activity instances.

16. A method as claimed in claim 10, wherein said descriptor enables control of re-creation of activity instances.

17. A method as claimed in claim 10, wherein said descriptor enables control of termination of activity instances.

18. A method as claimed in claim 10, wherein said descriptor permits creation of an activity instance identifier.

19. A computer program product comprising computer program instructions stored on a computer-readable medium for, when loaded into a computer and executed, causing the computer to carry out the steps of the method as claimed in claim 10.

20. A computer program product as claimed in claim 19, wherein said descriptor is programmable to enable definition of varying activity lifecycle characteristics according to a use made of said activity instance.

21. A computer program product as claimed in claim 20 wherein said use of said activity instance is responsive to a request by a client.

22. A computer program product as claimed in claim 20 wherein said use of said activity instance is responsive to a request by an activity instance.

23. A computer program product as claimed in claim 19, wherein said descriptor is flexibly programmable to modify said lifecycle behaviors according to a position in a system hierarchy of said activity instance.

* * * * *

Disclaimer

6,901,578 — John Anthony Beaven, Romsey (GB); Amanda Elizabeth Chessell, Alton (GB); Catherine Griffin, Romsey (GB); Iain Stuart Caldwell Houston, Dorset (GB); Martin Mulholland, Winchester (GB); Ian Robinson, Southhampton (GB); and David John Vines, Romsey (GB). DATA PROCESSING ACTIVITY LIFECYCLE CONTROL. Patent dated May 31, 2005. Disclaimer filed October 5, 2006, by the assignee, International Business Machines Corporation.

Hereby enters this disclaimer to all of the claims, of said patent.

*(Official Gazette, May 27, 2008)*